US00RE42468E

(19) United States
(12) Reissued Patent
Heigl et al.

(10) Patent Number: US RE42,468 E
(45) Date of Reissued Patent: Jun. 21, 2011

(54) STORAGE BATTERY CHARGING STATION

(75) Inventors: Bernd Heigl, Augsburg (DE); Bernd Ziegler, Hiltenfingen (DE); Rainer Ontl, Landsberg am Lech (DE)

(73) Assignee: Hilti Aktiengesellschaft, Schaan (LI)

(21) Appl. No.: 11/489,733

(22) Filed: Jul. 18, 2006

Related U.S. Patent Documents

Reissue of:
(64) Patent No.: 6,967,464
Issued: Nov. 22, 2005
Appl. No.: 10/616,545
Filed: Jul. 9, 2003

(30) Foreign Application Priority Data

Jul. 12, 2002 (EP) ..... 02405600

(51) Int. Cl.
*H02J 7/00* (2006.01)

(52) U.S. Cl. ..... 320/107; 320/150; 320/113; 320/114; 361/695; 429/62; 429/71; 429/83; 429/120; 429/123

(58) Field of Classification Search ..... 320/107, 320/112, 114, 150
See application file for complete search history.

(56) References Cited

U.S. PATENT DOCUMENTS 6,066,938 A * 5/2000 Hyodo et al. ..... 320/114
6,218,807 B1 * 4/2001 Sakaue et al. ..... 320/107
6,373,228 B1 * 4/2002 Sakakibara ..... 320/150
6,455,186 B1 * 9/2002 Moores et al. ..... 429/71
6,597,572 B2 * 7/2003 Nishikawa et al. ..... 361/695

FOREIGN PATENT DOCUMENTS

| | | |
|---|---|---|
| EP | 920105 | 6/1999 |
| EP | 951127 | 10/1999 |
| EP | 1100173 | 5/2001 |
| EP | 1178557 | 6/2002 |
| JP | 8185898 | 7/1996 |
| JP | 08185898 * | 7/1996 |

OTHER PUBLICATIONS

JPO Computer Translation of JP-08185898.*

* cited by examiner

*Primary Examiner* — Melissa J Koval
*Assistant Examiner* — Samuel Berhanu
(74) *Attorney, Agent, or Firm* — Abelman, Frayne & Schwab

(57) ABSTRACT

A charging station (1) for a rechargeable battery (5) that can be electrically and physically connected to the rechargeable battery (5). The charging station (1) has charger electronics (2) in a charger housing (3) and an electrical and physical contact interface (4) for the battery (5). An air blower (6) producing an air current (L) through two air vents (7a, 7b) is arranged in the charger housing (3). The air vent (7a) of the physical contact interface (4) is spatially associated with the battery (5) and the charger electronics (2) is arranged in the air current (L) to transfer heat. In the cooling process, in a first stage, an air volume (V) at cooling temperature CT is moved past the battery to transfer heat into and onto the battery and, in a second stage, the air volume (V) at an intermediate temperature IT>CT permeates the charger housing (2) containing the charging electronics (2.).

7 Claims, 1 Drawing Sheet

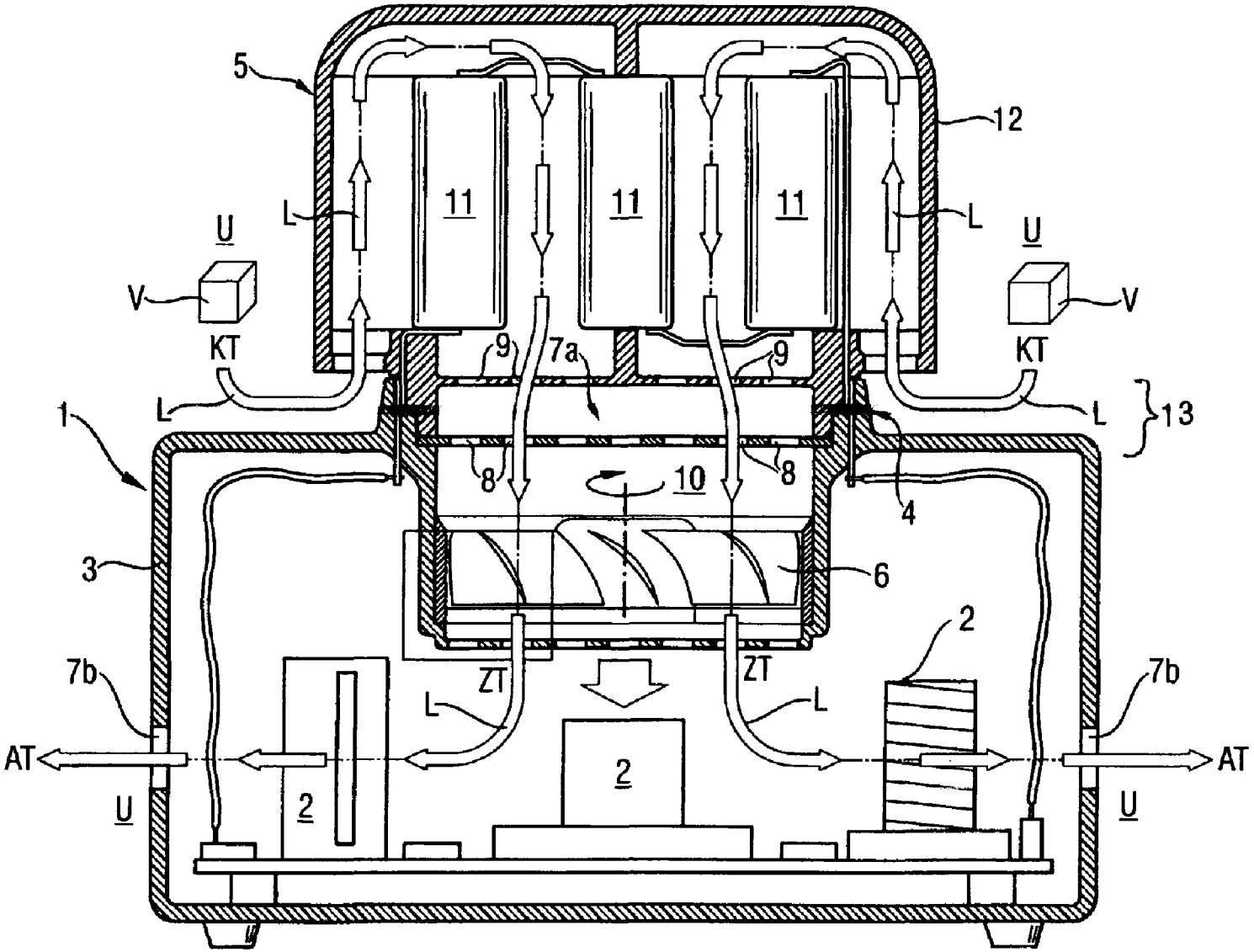
AT
7b
U
13
V
L
KT
12
2
4
6
11
9
8
ZT
10
7a
5
1
3

STORAGE BATTERY CHARGING STATION

Matter enclosed in heavy brackets [ ] appears in the original patent but forms no part of this reissue specification; matter printed in italics indicates the additions made by reissue.

BACKGROUND OF THE INVENTION

The invention relates to a charging station for a rechargeable battery that is structurally and electrically compatible with the battery, such as a storage battery module for cordless hand tool machines. In modern rechargeable batteries, high energy densities can be charged in a brief period using a charging station, whereby the battery heats up significantly. In addition, the charger electronics of the charging station also heat up significantly. An important field of application of such high-density energy rechargeable batteries are storage battery modules for cordless hand tool machines such as screwing drills, combination hammers, hand circular saws, etc.

EP 1178557 discloses a charging station for a rechargeable storage battery module of cordless band tool machines that can be electrically and structurally connected to the module. The charging station has charging electronics, in a charger housing, with an electrical and structural contact interface for the storage battery module. A blower is arranged in the charger housing. Optimally, a cooling and heating system is arranged between two air vents downstream of the airflow outlet. An air vent on the airflow outlet side is associated with the structural contact interface of the storage battery module. There is no active cooling of the charger electronics arranged, in the housing corners or in separate housing sections, external to the air flow. The air can, however, be pre-warmed by waste heat from the charger housing, which restricts the airflow before it cools the storage battery module. The warmed air from the storage battery module is discharged into the environment unused.

SUMMARY OF THE INVENTION

The object of the invention is to provide a process and a configuration for efficient cooling of the battery and the charging electronics.

This object is essentially achieved, in accordance with the invention, by a charging station for a rechargeable battery that can be connected structurally and electronically with the battery. The charging station has charger electronics in a charger housing with an electrical and physical contact interface for the battery. An air blower for producing an airflow through two air vents is arranged in the charger housing. An air vent is spatially associated with the physical contact interface of the battery and the charger electronics are arranged for heat transfer in the air current.

The arrangement of the battery and the charger electronics in series, in a common heat-transferring air current, cools efficiently, since the flow rate is involved in the heat transmission along with a constant cooling surface and the temperature difference.

It is also advantageous that the air vent spatially associated with the physical contact interface of the battery is arranged at the flow inlet side. As a result of this arrangement, the air warmed by the battery initially arrives in the charger housing with the air blower, where it cools the charger electronics and is then discharged to the environment.

The air blower is advantageously arranged between the air vent on the flow inlet side and the charger electronics. The charger electronics arranged in the high-pressure path The air vent on the flow inlet side advantageously forms multiple, surface distributed air inlet points, which are spatially associated with cooling vents of the battery, whereby the cooling air mass can be distributed to individual cells within the battery.

Advantageously, a pressure chamber with a low flow resistance is provided between the air blower and the air inlet points. This permits uniform distribution of the air volume between separate cells of the battery.

The air vent on the flow inlet side is advantageously arranged in the upper part of the charging station, wherein with expedient set-up of the charging station, less dust is picked up in the air current, which is particularly advantageous in polluted work sites.

Essentially, the cooling process of the aforementioned charging station moves a volume of air of an air current produced by an air blower arranged in the charger housing. In an initial process step, the air volume with a cooling temperature KT is moved past or into the battery while transferring heat. In a second process step, the air volume with an intermediate temperature IT>CT permeates the charger housing.

Different cooling heat transfers form for the same air volume due to the temporal sequence of the heat-transferring arrangement of the battery and the charging electronics. The heat transfers depend on the temperature difference. The permissible surface temperature of the charger electronics lies above the temperature of the battery. As a result, an air volume taken from this environment and having a cooling temperature CT [KT], initially cools the battery and then at the intermediate temperature IT [ZT] cools the charging electronics before it is again discharged to the environment at the waste heat temperature WT [AT]. Thus, the overall available streaming air volumes are taken advantage of for efficient cooling.

BRIEF DESCRIPTION OF THE INVENTION

The preferred embodiment of the invention is described below with reference to the drawing, wherein FIG. 1 shows a charging station with storage battery pack according to the invention.

DETAILED DESCRIPTION OF THE INVENTION

FIG. 1 shows a charging station 1 having a charging electronics 2 in a charger housing 3 that is physically and electrically connected to a rechargeable battery 5 (such as a storage battery module having a plurality of cells 11) by an electrical and physical contact interface 4. An air blower 6 is arranged in the charger housing 3. The blower 6 produces an air current L through two air vents 7a, 7b. The charger electronics 2 are arranged to transfer heat in the air current L.

The air vent 7a, on the flow inlet side, arranged in the upper section 13 of the charging station, is spatially associated with the physical contact interface 4 of the battery. The air blower 6 is arranged between the air vent 7a, on the flow inlet side, and the charging electronics 2. The air vent 7a on the flow inlet side has a plurality of surface-distributed air inlet points 8. Each surface-distributed air inlet point 8 is spatially associated with cooling vents 9 in the module housing 12 of the battery. A pressure chamber 10 having low flow resistance is arranged between the air blower 6 and the air inlet points 8.

The cooling process moves a hypothetical air volume V along an air current L produced by the air blower 6. The air volume V at a cooling temperature CT [KT] relative to the environment U moves past the battery 5 to transfer heat and them permeates charger housing 3. Charger housing 3 contains charger electronic that is arranged in air current L to transfer heat at an intermediated temperature IT>KT, before it is released into the environment U at a waste heat temperature WT [AT].

What is claimed is:

1. A charging station for a rechargeable battery (5) that can be physically and electrically connected to the battery (5) having charger electronics (2) in a charger housing (3) and an electrical contact interface (4) for the battery (5) that interfaces a vent (7a), wherein an air blower (6) is arranged in the charger housing (3) for producing an air current (L) through two air vents (7a, 7b), wherein one of the two air vents (7a) faces the battery (5), and wherein the charger electronics (2) is arranged to transfer heat in the air current (L) and wherein the air blower (6) is arranged between the air vent (7a) on a flow inlet side and the charger electronics (2).

2. The charging station of claim 1, *wherein* the air vent (7a) on a flow inlet side faces the battery (5).

3. The charging station of claim 1, wherein the air vent (7a) on the flow inlet side forms a plurality of surface-distributed air inlet points (8) each associated with cooling vents (9) of the battery (5).

4. The charging station of claim 3, wherein a pressure chamber (10) causing air to be distributed is arranged between the air blower (6) and the air inlet points (8).

5. The charging station of claim 1, wherein the air vent (7a) on the flow inlet side is arranged in an upper section (13) of the charging station (1).

6. A cooling process for a charging station (1) for a rechargeable battery (5) that is electrically and physically connected to the battery (5), wherein an air volume (V) of an air current (L) is moved by an air blower (6) arranged in the charger housing (3) of the charging station (1), comprising, a first step, wherein the air volume (V) at a cooling temperature CT is moved into the battery (5) to transfer heat, and, in a second step, the air volume (V) at an intermediate temperature IT>CT permeates the charger housing (3) containing the charger electronics (2).

*7. A charging station for a rechargeable battery (5) that can be physically and electrically connected to the battery (5), comprising a charger housing (3) having an electrical contact interface (4) for physically and electrically connecting the charger housing (3) with the rechargeable battery (5); charger electronics (2) located in the charger housing (3); and an air blower (6) for producing air flow through two air vents (7a, 7b) and located in the charger housing (3), wherein one of the two air vents (7a) faces the battery (5), and the charger electronics (2) is located, in the direction of the air flow, downstream of the battery (5) and upstream of another of the two air vents (7b), whereby an environmental air volume having a cooling temperature flows through the battery for cooling the same and then at an intermediate temperature, permeates the charger housing (3), cooling the charger electronics (2).*

* * * * *